G. W. HOYT.
PORTABLE HOUSE.
APPLICATION FILED MAR. 6, 1912.
1,070,474.
Patented Aug. 19, 1913
4 SHEETS—SHEET 3.
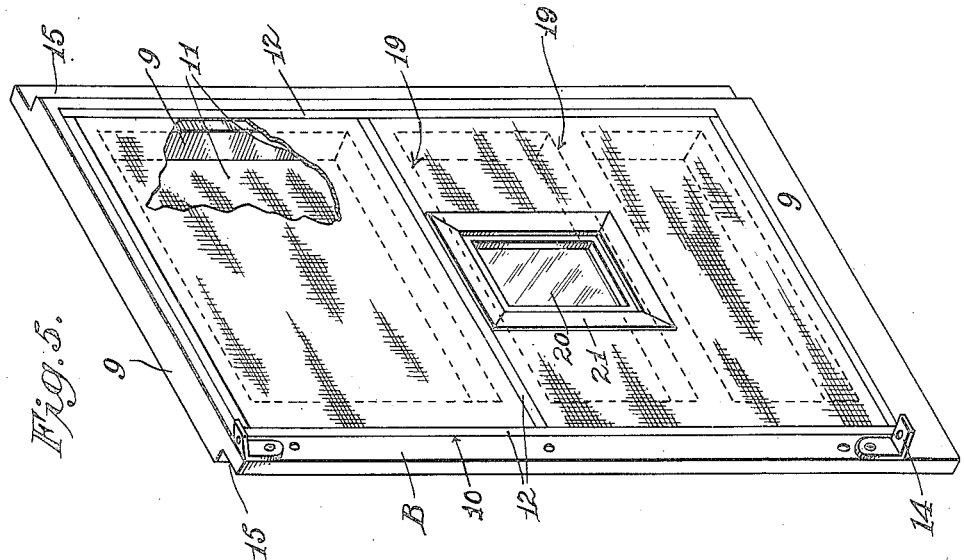
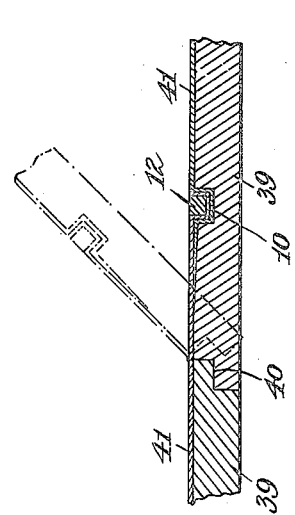
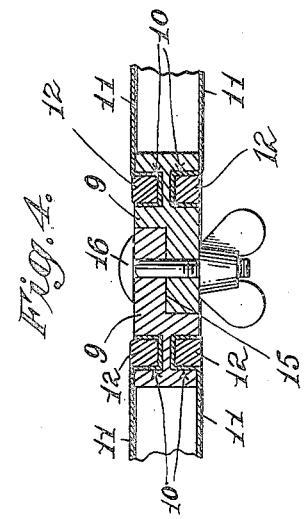
Attest:
Edna D. Moreland
Jeannette Williams
Inventor:
by George W. Hoyt
E. W. Scherz, Atty

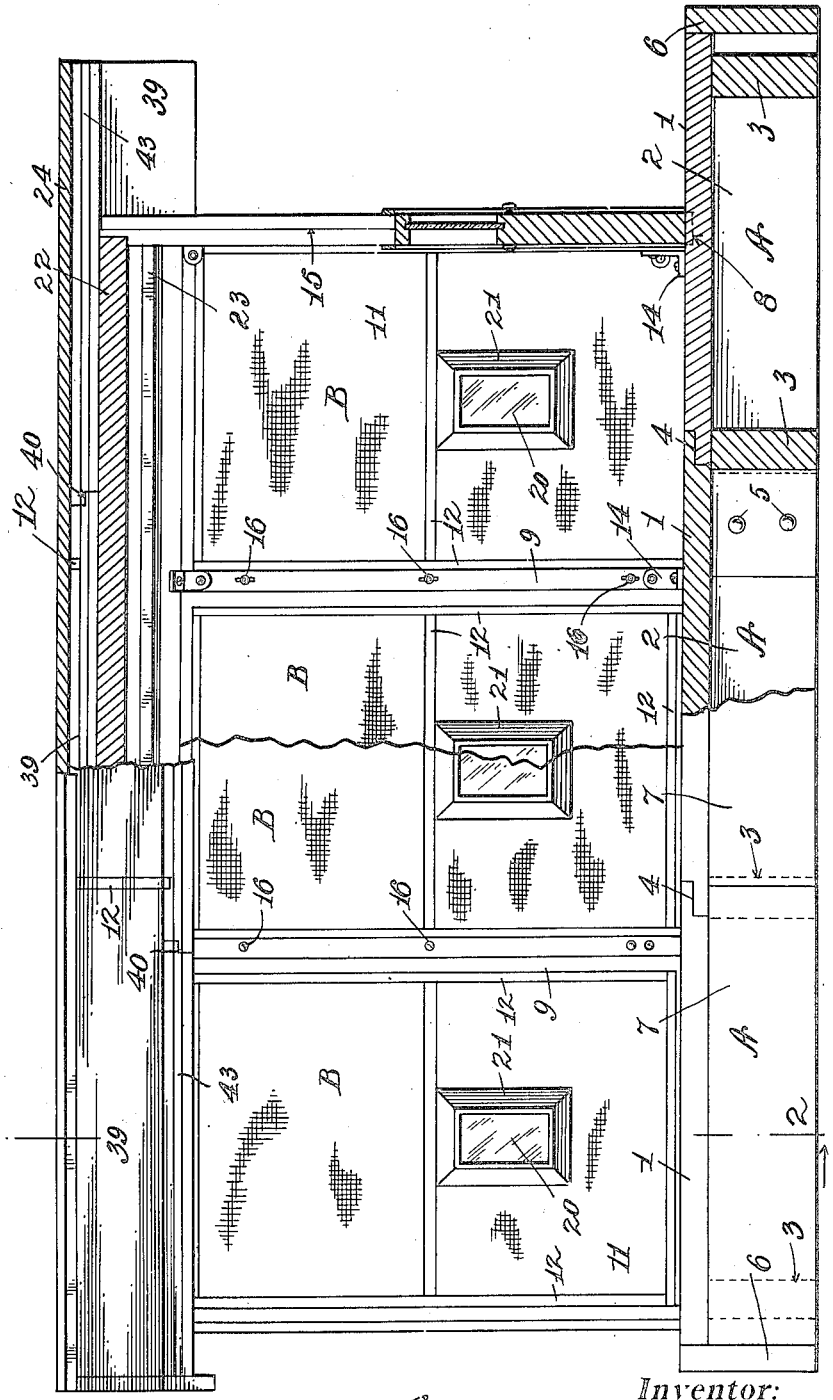

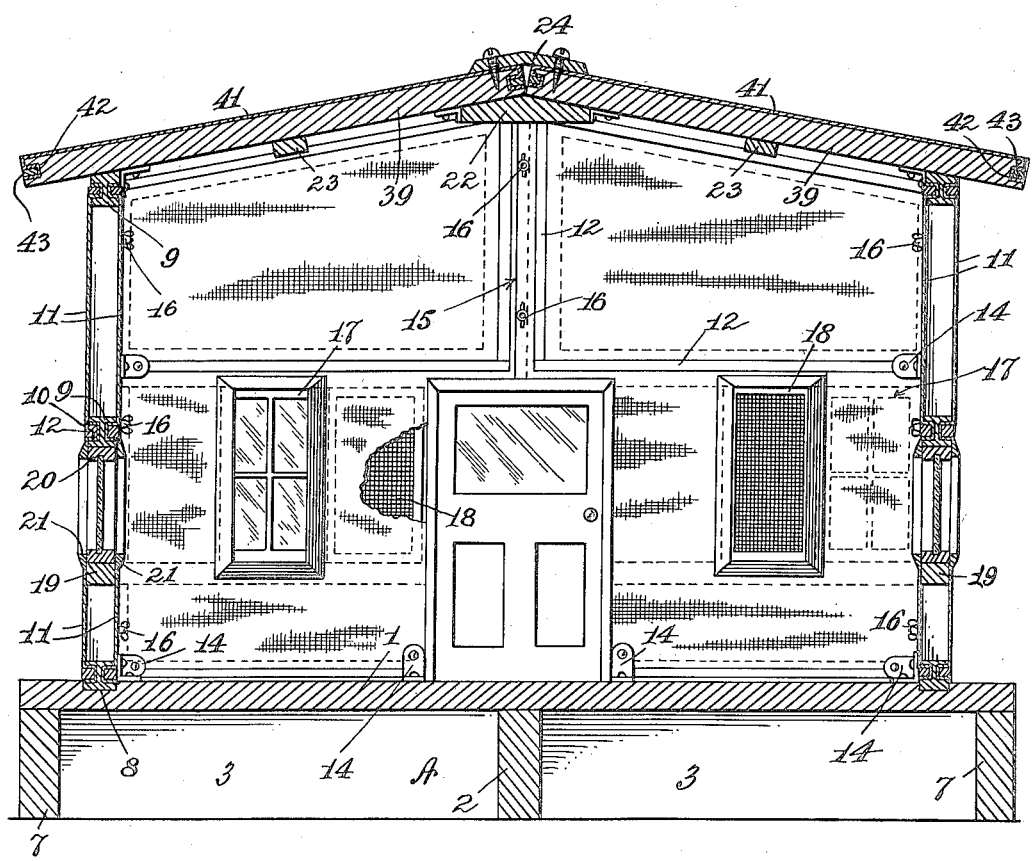

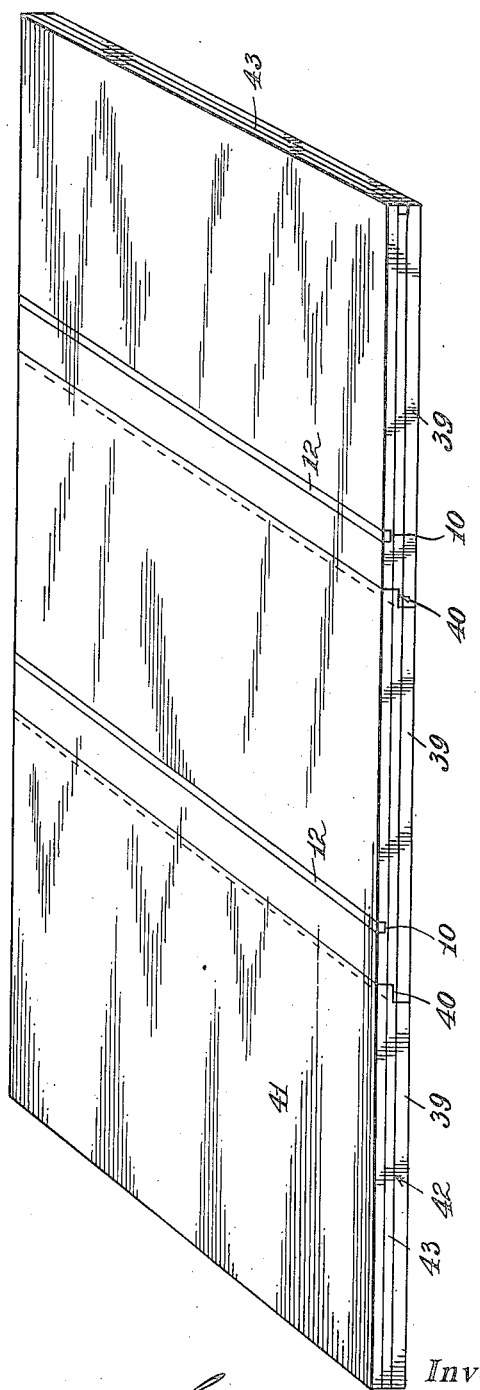

UNITED STATES PATENT OFFICE.

GEORGE W. HOYT, OF NEW YORK, N. Y., ASSIGNOR OF ONE-THIRD TO W. G. WALSH AND ONE-THIRD TO VINCENT D. WALSH, BOTH OF NEW YORK, N. Y.

PORTABLE HOUSE.

1,070,474.  Specification of Letters Patent.  Patented Aug. 19, 1913.

Application filed March 6, 1912. Serial No. 681,886.

*To all whom it may concern:*

Be it known that I, GEORGE W. HOYT, a citizen of the United States, residing at New York, in the county of New York and State of New York, have invented certain new and useful Improvements in Portable Houses, of which the following is a specification.

My invention relates to improvements in portable houses. Its advantages are that it is light in weight yet weather-proof and gives excellent protection against both heat and cold. Further, the construction is simple and adapted to be made of inexpensive materials.

In the drawings which show only one of the specific embodiments which my invention is adapted to take, Figure 1 is a side elevation partly in vertical section of an assembled portable house within my invention; Fig. 2 is a transverse section on the line 2—2 in Fig. 1 looking in the direction of the arrows; Fig. 3 is a fragmentary view on an enlarged scale of a detail of the roof construction; Fig. 4 is a fragmentary view on an enlarged scale showing how the unit wall-sections overlap and are united; Fig. 5 is a perspective view of one of the unit wall-sections detached; and Fig. 6 is a perspective view of one-half of the roof of the same house.

I will now describe the devices of the drawings, reserving it to the claims to point out the novel features and to define the scope of the invention, it being understood that the claims will be given the due range of equivalents to which they may be entitled in view of the art.

The house will be shipped in knocked-down condition consisting of the various unit platform-, wall- and roof-sections or units, beams and other accessories. The particular shape of these sections will determine the nature of the house, and therefore by varying the shape of said sections, most any kind of house can be made. In short, my invention is not limited to any particular kind of house, much less to the particular house shown.

The platform or foundation of the house is in unit sections A, each consisting of a floor portion 1 supported on longitudinal beams 2 and transverse beams 3. The floor portions 2 of consecutive units fit together by a rabbet joint 4. The floor units are fastened together on the site of the house by angle irons 5 bolted to the longitudinal beam 2 of one section and the transverse beam 3 of the consecutive section. End and side boards 6 and 7, the latter, in the particular construction shown in the drawings, being perhaps more properly designated beams, finish the ends and sides of the foundation of the house.

The floor portions 1 have trough-like grooves 8 in them which together form a rectangle when said portions 1 are assembled. The wall-sections B of the house sit down into these grooves which thereby prevent water from entering the house.

Each wall-section B consists of a frame 9 having grooves 10 (compare Figs. 2, 4 and 5) around both of its faces. 11 designates water-proof fabric or its equivalent secured to each face of the frame 9 and tightly stretched thereon by strips 12 driven snugly into the grooves 10 to carry the fabric with them into said grooves. When the projecting free edges of the fabric are trimmed off, a perfect inside and outside finish is given to the wall. Furthermore, the joint is waterproof. Again, the preferred use of fabric on both sides of the frame 9 gives a double wall with an inclosed air space, making the wall a poor conductor of both heat and cold so that the house tends to be cool in summer and warm in winter. The preferred material 11 is army canvas which may be further waterproofed by painting it. As already stated, the bottom of these wall-sections B sit down into the floor groove 8 and they are permanently secured to the floor by angle irons 14 on said frames. The frames are rabbeted at their sides 15 so as to fit together with an overlapping joint (compare Fig. 4) through which the bolts 16 pass to secure the frames together.

The space between the material 11 of the frames is well adapted to receive the sliding windows 17 and screens 18. As shown in Fig. 5, each section may be divided into several panels by horizontal or vertical members or both so that each of these panels constitutes a frame having the grooves 10 into which the fabric is secured by these strips 12. In Fig. 5 these horizontal members are designated 19 and they support the guides (compare Fig. 2) in which the sash 20 slides in horizontal direction.

21—21 are stationary window frames mounted opposite each other on the two faces of the wall unit.

The end of the house shown in Fig. 2 consists of three unit sections, a lower and two upper, the lower section extending clear across the end of the house and containing the shown windows and door. Either the glass sash 17 or the screened sash 18 can be slid in front of the window opening.

The roof is supported on the ridge pole member 22 (Figs. 1 and 2) and by beams 23 suitably secured at their ends to the tops of the end sections of the house. The roof may consist of stretched fabric frames similar to those already described laid on the ridge pole and rafters, but I prefer for greater solidity and strength to make the roof of solid board sections covered with canvas. Thus, the particular roof illustrated consists of two halves, each in three hinged together solid board sections 39. A cap member 24 runs lengthwise of the roof and covers the joint between the two halves of the roof.

Fig. 6 shows one-half of the roof in perspective. It consists of the wooden units 39 rabbeted together at their abutting edges 40. Each unit 39 has a groove 10 near one edge receiving a wooden strip 12. The canvas is put on in overlapping sections 41, the canvas section that covers one of the wooden units 39 extending over the joint 40 and being secured in the groove 10 under the strip 12 of the adjacent wooden section 39 along with the canvas 41 belonging to the last named wooden section. In this way, waterproof joints are made between the canvas sections 41. Finally, the peripheral portions of these canvas sections 41 are taken care of by securing them in grooves 42 (Fig. 2) around the marginal edges of the wooden sections 39 by means of the strips 43, and this also serves to draw the canvas taut over the wooden sections.

What I claim is:

1. In a portable house, a roof comprising a plurality of adjacent sections, independent pieces of fabric covering the several sections and overlapping adjacent sections and each other at their adjacent edges whereby to constitute hinge pieces, the upper surface of said sections being grooved under said overlapping portions of the fabric, and strips holding said overlapping portions in said grooves.

2. In a portable house, a roof comprising a plurality of adjacent sections, independent pieces of fabric covering the several sections and overlapping adjacent sections and each other at their adjacent edges, the overlapping edges being secured to the adjacent edges of the adjacent sections whereby to form hinges, said securing means including grooves formed under the overlapping portions of the fabric, and strips holding said overlapping portions in the said grooves.

In testimony whereof I affix my signature in presence of two witnesses.

GEORGE W. HOYT.

Witnesses:
THERON M. HASTING,
JAMES J. GOLDBERG.